United States Patent [19]

Chen et al.

[11] Patent Number: 4,482,529

[45] Date of Patent: Nov. 13, 1984

[54] CATALYTIC HYDROLYSIS OF COS IN ACID GAS REMOVAL SOLVENTS

[75] Inventors: Michael S. Chen, Zionsville; James T. Edwards, Allentown, both of Pa.; William R. Ernst, Roswell, Ga.

[73] Assignee: Air Products and Chemicals, Inc., Allentown, Pa.

[21] Appl. No.: 456,222

[22] Filed: Jan. 7, 1983

[51] Int. Cl.$^3$ .............................................. C01B 17/00
[52] U.S. Cl. ................................... 423/243; 423/437; 423/563
[58] Field of Search ............... 423/243, 242 A, 242 R, 423/244 A, 244 R, 563, 437

[56] References Cited

U.S. PATENT DOCUMENTS

| | | | |
|---|---|---|---|
| 2,395,509 | 2/1946 | Shaw | 423/243 |
| 3,620,674 | 11/1971 | Ranault et al. | 423/243 |
| 3,965,244 | 6/1976 | Sykes, Jr. | 423/228 |
| 3,966,875 | 6/1976 | Bratzler et al. | 423/220 |
| 4,001,066 | 1/1977 | Channing et al. | 156/152 |
| 4,096,085 | 6/1978 | Holoman, Jr. et al. | 252/189 |
| 4,100,256 | 7/1978 | Bozzelli et al. | 423/243 |
| 4,112,049 | 9/1978 | Bozzelli et al. | 423/226 |
| 4,112,052 | 9/1978 | Sartori et al. | 423/243 |
| 4,351,812 | 9/1982 | Correll et al. | 423/243 |

FOREIGN PATENT DOCUMENTS 461001  2/1937  United Kingdom ............... 423/243

OTHER PUBLICATIONS

"Absorption of Carbonyl Sulphide in Amines and Alkalis" by M. M. Sharma and P. V. Danckwerts, Chemical Engineering Science, 1964, vol. 19, pp. 991–992.

"Kinetics of Reactions of Carbonyl Sulphide and Carbon Dioxide with Amines and Catalysis by Bronsted Bases of the Hydrolysis of COS", by M. M. Sharma, Trans. Faraday Society, 1965, vol. 61, pp. 681–687.

Primary Examiner—Gregory A. Heller
Attorney, Agent, or Firm—Mark L. Rodgers; E. Eugene Innis; James C. Simmons

[57] ABSTRACT

Hydrolysis of COS in gas streams to $H_2S$ and $CO_2$ can be improved by the addition of certain bicyclo amine catalysts to acid gas removal solvents.

14 Claims, No Drawings

CATALYTIC HYDROLYSIS OF COS IN ACID GAS REMOVAL SOLVENTS

TECHNICAL FIELD OF THE INVENTION

The present invention relates to catalytic hydrolysis of carbonyl sulfide (COS). More particularly it is concerned with COS hydrolysis by bicyclo amine catalysts in conjunction with an acid gas removal solvent.

BACKGROUND OF THE INVENTION

The removal of carbonyl sulfide (COS) from mixtures of gases by liquid absorbents is an important industrial operation. Refinery and synthetic gases, derived from either petroleum fractions or coal, often contain significant amounts of COS. The manufacture of olefins, notably $C_2H_4$ and $C_3H_6$, from petroleum fractions also entails absorption of COS because of the close boiling points of COS and $C_3H_6$. It is necessary to remove COS down to a few ppm for several reasons, such as catalysts sensitivity to COS in subsequent operations, statutory regulations regarding sulfur content in vent gas, and corrosion aspects of sulfur compounds in pipelines. In addition, the presence of COS has been identified as the cause of nonreversible degradation reactions in several commercial acid gas removal processes. This necessitates additional capital and energy costs for reclaiming and/or replacing the resulting spent solvent.

COS can be absorbed along with $H_2S$ and $CO_2$ in a variety of chemical and physical solvents. Sykes, U.S. Pat. No. 3,965,244, Bozzelli, et al. U.S. Pat. No. 4,100,256, and U.S. Pat. No. 4,112,049, all teach the use of chemical solvents to hydrolize COS. The prime examples of chemical solvents are aqueous solutions of primary and secondary amines such as monoethanol amine (MEA) and diethanol amine (DEA), respectively. While COS can be removed from the gas effectively by these chemical solvents, it generally degrades the solvents by forming undesirable stable compounds such as thiocarbonates, as in the case of MEA and DEA. Substantial thermal energy is required to regenerate the spent solvents, therefore increasing processing costs.

The trend in the art has been to employ physical solvents in place of these chemical solvents. Physical solvents do not have the disadvantage of forming undesirable stable compounds as discussed above, and can absorb more gas under pressure than chemical solvents. Physical solvents such as polyethylene glycol dimethyl ether, sold under the tradename Selexol, and cold methanol, sold under the tradename Rectisol, remove acid gases based on the principle of physical absorption, i.e. Henry's Law. When used alone however, physical solvents are often inadequate, especially when used in coal gasification operations where large amounts of COS are present.

To overcome this drawback, current commercial practice is to effect gas phase COS hydrolysis over a suitable catalyst. Catalysts such as Pt on $Al_2O_3$ have been employed for this hydrolysis. There are two problems with this process however. First, COS hydrolysis is incomplete and limited by the equilibrium of the reaction if $H_2S$ and $CO_2$ are not removed. Second, if $H_2S$ and $CO_2$ are removed first at lower temperature, the gas stream would have to be heated up for COS hydrolysis, followed by another step for $H_2S$ removal. This procedure is costly due to the large energy requirement.

European Patent Application No. 0,008,449 discloses adding a monocyclic amine catalyst to an aqueous solvent to effect COS hydrolysis. Operation of this method however requires a high concentration of catalyst; up to 90% for example; and is only effective when small amounts of COS are present. This method also has the disadvantage in that unwanted salts tend to form from the contact of the hydrolysis products with the excess monocyclic catalyst.

U.S. Pat. Nos. 3,966,875 and 4,011,066 disclose using homogeneous catalysts in physical acid gas removal solvents. This reference however only discloses using mono-cyclic amine catalysts such as 1,2-dimethylimidazole, and teaches using separate hydrolysis and absorption towers. These mono-cyclic catalysts have only moderate activity for COS hydrolysis.

Holoman, et al. U.S. Pat. No. 4,096,085 discloses adding a bicyclo tertiary amine to an acid gas scrubbing system. This reference teaches adding a small amount of bicyclo amine to a chemical solvent to inhibit corrosion in the system. We have demonstrated that it takes a larger concentration of the bicyclic amine than is disclosed in this reference to effect COS hydrolysis. In addition, Holoman only teaches adding these compounds to chemical acid gas removal solvents.

SUMMARY OF THE INVENTION

It has now been found that COS hydrolysis to $H_2S$ and $CO_2$ can be improved by the addition of a bicyclo amine catalyst to an acid gas removal solvent.

DETAILED DESCRIPTION OF THE INVENTION

A process for the hydrolysis of COS to $H_2S$ and $CO_2$ is effected when a COS containing gas is contacted with an acid gas removal solvent containing certain bicyclo tertiary amines. Refinery, synthesis or other COS containing gases are contacted with an acid gas removal solvent containing one or more of the claimed compounds. This contact usually takes place in an absorption tower in a typical acid gas scrubbing system.

The compounds which have been found to enhance COS hydrolysis in a typical acid gas removal system are bicyclo tertiary amines having the general formula:

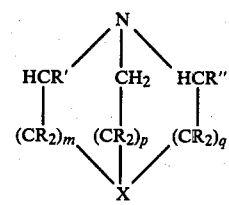

wherein x represents H—C or N; R and R' represent H, $CH_3$— or $C_2H_5$—; R" represents H or $CH_3$— only if R' is not $C_2H_5$; and m, p and $q \geq 1$; and bicyclo amidines having the general formula

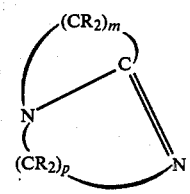

wherein R represents H, $CH_3$— or $C_2H_5$—, m is 3, 4 or 5 and p is 2, 3 or 4.

These compounds are effective to enhance COS hydrolysis in both chemical and physical acid gas removal solvents, although physical solvents are generally preferred. Examples of such physical solvents include Selexol, PEG 400, Propylene carbonate, N-β-hydroxyethyl morpholine, N-methyl-2-pyrrolidone, methanol, sulfolane, tributyl phosphate and water.

The exact mechanism by which COS hydrolysis is catalyzed by these bicyclic tertiary amines is not fully understood. The use of these claimed compounds as a catalyst for hydrolysis however, can result in a complete elimination of COS in the process stream. Hydrolysis occurs in-situ following the physical absorption of COS in the solvent under nonextreme conditions of temperature and of pressure. Since the resulting hydrolysis products, $H_2S$ and $CO_2$, usually have widely differing solubilities in the conventional acid gas physical solvents, sulfur removal can be accomplished efficiently.

Since the process of the present invention operates with a wide variety of solvents, the operating conditions of the process are widely varied. Generally, the pressure should be in a range of about 15 psia to 2000 psia for the acid gas containing streams and for the absorber and desorber. The preferred range would be about 200 psia to 1200 psia. The temperature range should be between the freezing and boiling points of the solvents. This is between about −20° C. and 350° C., with a range of about −10° C. to 200° C. being preferred. The catalysts should be present in a concentration of about at least 0.02 to 8 g-mole/l, with a concentration of about 0.05 to 1 g-mole/l being preferred. Water should be present in the solvent system in a concentration of 0.1 to 60 wt. % with a preferred concentration from about 0.5 to 10 wt. %.

The fact that the process of the present invention employs catalysts which are homogeneous and are used in-situ eliminates the need for a separate processing step at extreme conditions as is the case in the presently practiced heterogeneous catalyst COS hydrolysis technology. It was also found that these catalysts, when added to a solvent, enhanced the solubility of either or both $H_2S$ and $CO_2$ such that the solvent capacity and/or selectivity is improved. The catalysts involved in the claimed process can be utilized in any gas removal solvent and in any process scheme designed for $H_2S$ and/or $CO_2$ removal to achieve the benefits listed above.

The present invention is superior to the processes of U.S. Pat. Nos. 3,966,875 and 4,011,066 in that the bicyclic amine catalysts of the invention show significantly more activity than the monocyclic catalysts of the above-cited references. The present invention also allows for a single step process whereas the cited references involve separate hydrolysis and absorption steps.

The following examples are illustrative of the process of the present invention and are not intended to be limiting.

RESULTS

EXAMPLE 1

A gas mixture of $CH_4$, $CO_2$, $H_2S$, COS (approx. 1% each) and He were injected into 160 ml glass bottles at a rate of 150 ml/min. until the outlet and inlet gas compositions were identical. Each bottle was then charged with a measured amount of solvent (32 ml, 3 wt.% $H_2O$) with and without catalyst by a syringe through the septum while an equal volume of gas was displaced through another syringe. The bottles were then immediately placed on a shaker at room temperature (17°–20° C.) for a period of time (approx. 30 min.) for the reaction to take place. Gas samples were taken for GC analysis.

For each solvent-catalyst pair, a blank run (without the catalyst) was also made to provide a baseline for comparison. The net amount of COS removal from the gas phase over and above the pure physical absorption from the blank run was used to calculate the catalyst hydrolysis activity, defined as follows:

$$\text{Catalyst activity (min-M)}^{-1} = \frac{\left[\ln \frac{\text{COS (t) without catalyst}}{\text{COS (t) with catalyst}}\right]}{(\text{catalyst conc.})(\Delta t)}$$

Where

| | |
|---|---|
| COS (t) without catalyst = | gas phase COS concentration at time t without catalyst in the solvent. |
| COS (t) with catalyst = | gas phase COS concentration at time t with catalyst in the solvent. |
| $\Delta t$ = | time, in minutes, of gas/liquid contact in the bottles. |
| Catalyst conc. = | catalyst concentration in the solvent varying from 0.1 to 1 M (i.e. g-mole/l) |

The catalysts and solvents used were as follows:

| Catalysts | | Molecular Wt. (MW) | $pk_B$ at 25° C. |
|---|---|---|---|
| C1 | Quinclidine | 111.2 | 3.5 |
| C2 | 1,4-Diazabicyclo[2,2,2]-Octane (DABCO ®-Registered Trademark of Air Products and Chemicals, Inc.) | 112.2 | 5.4 |
| C3 | 1,5-Diazabicyclo[5,4,0]-Undec-5-ene | 152.2 | 1.6 |
| C4 | 1,5-Diazabicyclo[4,3,0]-non-5-ene | 124.2 | 1.3 |
| C5 | 1,2-Dimethylimidazole | 82.11 | 6.3 |

| Solvents | | Molecular Wt. | Freezing Point °C. | Boiling Point °C. |
|---|---|---|---|---|
| S1 | Dimethylether of polyethylene glycols (Selexol) | 280 | −22.2 to −28.9 | — |
| S2 | Polyethylene glycol (PEG 400) | 400 | — | — |
| S3 | Propylene carbonate | 102 | −49.2 | 241.7 |
| S4 | N—β-Hydroxyethyl morpholine | 131.2 | — | 225.5 |
| S5 | N—Methyl-2-pyrrolidone | 99.1 | −24 | 202 |
| S6 | Methanol | 32 | −47.8 | 64.5 |
| S7 | Sulfolane (tetrahydrothiophene dioxide) | 120.2 | 27 | 285 |
| S8 | Tributyl phosphate | 266.32 | −80 | 292 |
| S9 | Water | 18 | 0 | 100 |

The results of this experiment for the five catalysts in nine common physical solvents are shown in Table 1 below.

TABLE 1

Summary of 5 Tertiary Amines' Catalytic Activities in 9 Common Physical Solvents from Bottle Shaker Tests at Known Temperatures

| | | Catalyst Activity (min-M)$^{-1}$ | | | | |
|---|---|---|---|---|---|---|
| | Solvent | C1 | C2 | C3 | C4 | C5 |
| S1 | Selexol | .54 | .39 | 2.7 | 2.3 | .17 |
| S2 | PEG 400 | .08 | .20 | .19 | >.19 | .03 |

TABLE 1-continued

Summary of 5 Tertiary Amines' Catalytic Activities in 9 Common Physical Solvents from Bottle Shaker Tests at Known Temperatures

| | Solvent | Catalyst Activity (min-M)$^{-1}$ | | | | |
|---|---|---|---|---|---|---|
| | | C1 | C2 | C3 | C4 | C5 |
| S3 | Propylene Carbonate | .33 | .33 | .07 | >.07 | .07 |
| S4 | N—β Hydroxyethyl Morpholine | .12 | .02 | >.12 | >.12 | 0 |
| S5 | N—Methyl-2 pyrrolidone | 2.10 | 1.37 | >2.1 | >2.1 | .23 |
| S6 | Methanol | 1.66 | .19 | >1.66 | >1.66 | .78 |
| S7 | Sulfolane | 1.38 | .58 | >1.38 | >1.38 | 0 |
| S8 | Tributyl Phosphate | .62 | .46 | >.62 | >.62 | .01 |
| S9 | Water | .75 | .10 | .78 | .81 | .03 |
| Overall | Ranking | 3 | 4 | 1 | 2 | 5 |

These results clearly demonstrate that these catalysts are capable of hydrolyzing COS in a wide variety of commonly used physical solvents. It was also found that the catalyst activity tends to decrease with increasing $pK_B$ values. C1 to C4, the catalysts used in the claimed process, showed significantly higher activity than C5, 1,2-dimethylimidazole.

EXAMPLE 2

To demonstrate the improvement of the catalysts in physical solvents for COS removal from a gas in a more typical scrubbing system, applicants ran experiments in a laboratory packed column operated under a gas-liquid countercurrent mode using DABCO (C2) catalyst in Selexol solvent (S1). The operating conditions were:
Column = 1" diameter × 42" packed height
Packing material = 0.12" Propak stainless steel packing
Inlet Gas Composition = 1% COS in bulk $CO_2$
Pressure = 1 atm
Inlet Liquid = Selexol with 2.5 wt.% $H_2O$ with and without DABCO (C2) catalyst.

The packed column was run partially flooded with solvent, that is, the column was initially filled with the solvent to a predetermined height, then the gas was introduced at the bottom to expand the liquid to the top of the column. The gas passed up the column with discrete gas bubbles when the liquid ran down as a continuous phase. The results of several operating conditions are set out in Table 2.

TABLE 2

| Run # | (C2) DABCO Catalyst conc. M | Liq. Temp. °C. | Flow rate Gas | cm$^3$/ min. Liq. | COS conc. In | % vol. Out | % COS Removal |
|---|---|---|---|---|---|---|---|
| 19-1 | 0 | 21 | 802 | 13.06 | 1.093 | 0.975 | 10.8 |
| 20-2 | 0 | 23 | 793 | 13.06 | 1.091 | 0.966 | 11.5 |
| 17-1 | 0.2 | 22 | 801 | 13.06 | 1.091 | 0.933 | 14.6 |
| 20-1 | 0.0 | 23 | 790 | 8.4 | 1.084 | 1.03 | 5.0 |
| 19-2 | 0.0 | 23 | 797 | 8.4 | 1.093 | 1.035 | 5.3 |
| 18-1 | 0.2 | 21 | 807 | 8.4 | 1.087 | 0.984 | 9.5 |
| 23-1 | 0.0 | 49 | 804 | 13.06 | 1.080 | 0.994 | 8.0 |
| 25-1 | 0.2 | 50 | 805 | 13.06 | 1.087 | 0.868 | 20.2 |
| 24-1 | 0.0 | 49 | 804 | 8.4 | 1.085 | 1.034 | 4.7 |
| 26-1 | 0.2 | 50 | 800 | 8.4 | 1.081 | 0.907 | 16.1 |

These results show that the addition of DABCO catalyst (C2) to a physical acid gas removal solvent greatly enhances COS removal, especially at higher temperatures.

EXAMPLE 3

To further demonstrate catalyst effectiveness in removing COS from a gas, applicants ran experiments in a flow reactor in which a COS-containing gas was sparged through a liquid pool under stirring.
Catalyst = DABCO (C2)
Solvent = N-methyl-2-pyrrolidone (S5) with 2.5 wt.% $H_2O$
Liq. volume = 150 ml
Gas composition = 1.6 to 2% COS, 2.2% $CH_4$ and bulk He with trace $CO_2$
Temp = 25° C.
Pressure = 1 atm.

TABLE 3

| | | Gas Composition $\left(\frac{mole\ COS}{mole\ CH_4}\right)$ | | |
|---|---|---|---|---|
| Run # | Conc. M | In | Out | % COS Removal |
| 6 | 0 | 0.74 | 0.54 | 27 |
| 3 | 0 | 0.75 | 0.51 | 32 |
| 4 | 0.06 | 0.74 | 0.35 | 52 |
| 5 | 0.18 | 0.74 | 0.19 | 74 |
| 1 | 0.25 | 0.75 | 0.14 | 81 |
| 2 | 1.94 | 0.75 | 0.026 | 97 |

This example illustrates that the solvent itself possesses COS hydrolysis activity but, with the addition of the catalyst, COS removal is increased through additional hydrolysis.

EXAMPLE 4

Similar to the flow reactor experiments in Example 3, applicants ran experiments with C4 catalyst in Selexol (S1).
Catalyst = 1.5 Diazabicyclo[4,3,0]non-5-ene (C4)
Solvent = Selexol (S1) with 2.5 wt.% $H_2O$
Liquid volume = 250 ml
Gas rate = 150 ml/min
Inlet Gas composition = 1% COS in bulk $CO_2$
Temperature = 20°-25° C.
Pressure = 1 atm.

TABLE 4

| | Cat Con. M | % COS Removal | Time of Steady-State Hours |
|---|---|---|---|
| #1 | 0 | 0 | 7.5 |
| #2 | 0.2 | 40-60 | 152 |

This example illustrates that this particular solvent itself has no hydrolysis activity but with 0.2M of catalyst concentration COS removal is increased solely due to the presence of the catalyst.

EXAMPLE 5

This test was run to determine if, under the conditions of U.S. Pat. No. 4,096,085 where bicyclo tertiary amines were added as corrosion inhibitors, there would be any significant COS hydrolysis due to the addition of these compounds.

The concentration ranges of U.S. Pat. No. 4,096,085 are 10-15 wt.% bicyclo amine, (C2), in the inhibitor formulation and 10 to 2000 ppm of inhibitor in the aqueous MDEA or DEA solution.

The typical concentration of aqueous MDEA or DEA is in the range of 30 to 50 wt.%, so the maximum bicyclo amine concentration added as a corrosion inhibitor in these solutions can be calculated as follows:
Max bicyclo amine wt. Concentration = (50 wt%) (2000 ppm) = (0.5) (2000 × 10$^{-6}$) = 0.001 = 0.1%.
At this concentration, the molar concentration in our typical solvent; 2.5 wt% H$_2$O in Selexol; can be calculated as follows:

Bicyclo amine molar concentration =

$$\left(\frac{0.001 \text{ g (C2) catalyst}}{\text{g solvent}}\right)\left(\frac{1 \text{ g-mole}}{112.17 \text{ g}}\right)\left(\frac{1000 \text{ g solvent}}{1 \text{ solvent}}\right) =$$

0.00892 g-mole Bicyclo amine/1 solvent

This concentration is very close to our experiment using 0.01M (i.e. g-mole/l) DABCO catalyst, (C2), in 2.5 wt.% H$_2$O/Selexol, (S1), in shaking bottle tests. At 27° C. and 0.5 hour shaking time, we had the following results:

| Gas Conc. | H$_2$O in Selexol | | 0.01M DABCO catalyst in the same | |
|---|---|---|---|---|
| | 0 Hr. | ½ Hr. | 0 Hr. | ½ Hr. |
| Air | 0.17 | 5.86 | 0.14 | 2.56 |
| CH$_4$ | 1.0 | 1.0 | 1.0 | 1.0 |
| CO$_2$ | 0.90 | 0.63 | 0.91 | 0.57 |
| H$_2$S | 1.00 | 0.07 | 1.07 | 0.12 |
| COS | 1.32 | 0.42 | 1.33 | 0.41 |
| H$_2$O | — | 2.87 | — | 2.79 |

It is clear from the above table that 0.01M DABCO catalyst in the solvent did not contribute any COS removal over and above what the solvent can absorb through the normal gas solubility.

Having thus described the present invention, what is now deemed appropriate for Letters Patent is set out in the following appended claims.

What is claimed is:

1. A process for hydrolyzing COS present in a gas stream to H$_2$S and CO$_2$ comprising contacting said gas stream with an acid gas removal solvent, and adding a bicyclo tertiary amine in a concentration range of 0.02 to 8.0 g-mole/l to said acid gas removal solvent, said bicyclo tertiary amine having the general formula:

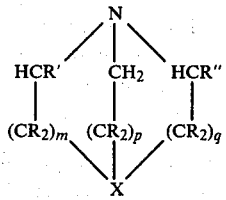

wherein X represents H—C or N; R and R' represent H, CH$_3$ or C$_2$H$_5$—; R" represents H or CH$_3$— only if R' is not C$_2$H$_5$; and m, p and q ≧ 1.

2. The process in accordance with claim 1, wherein X represents H—C; R, R' and R" represent H; and m, p and q represent 1.

3. The process in accordance with claim 1, wherein X represents N; R, R' and R" represent H; and m, p and q represent 1.

4. The process in accordance with claim 1, wherein said process is run at a pressure in the range of 200 to 1200 psia.

5. The process in accordance with claim 1, wherein said process is run at a temperature in the range of −10° C. to 200° C.

6. The process in accordance with claim 1, wherein said bicyclo tertiary amine concentration is 0.05 to 1 g-mole/l.

7. The process in accordance with claim 1, wherein said acid gas removal solvent is a physical solvent selected from the group consisting of Selexol, PEG 400, Propylene carbonate, N-β-hydroxyethylmorpholine, N-methyl-2-pyrrolidone, methanol, sulfolane, tributyl phosphate and water.

8. A process for hydrolyzing COS present in a gas stream to H$_2$S and Co$_2$ comprising contacting said gas stream with an acid gas removal solvent and adding a bicyclo amidine in a concentration range of 0.02 to 8.0 g-mole/l to said acid gas removal solvent, said bicyclo amidine having the general formula:

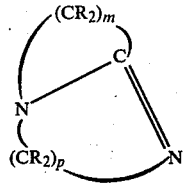

wherein R represents H, CH$_3$— or C$_2$H$_5$—; m is 3, 4, or 5; and p is 2, 3 or 4.

9. The process in accordance with claim 8, wherein R represents H, m = 5; and p = 3.

10. The process in accordance with claim 8, wherein R represents H; m = 3; and p = 3.

11. The process in accordance with claim 8, wherein said process is run at a pressure in the range of 200 to 1200 psia.

12. The process in accordance with claim 8, wherein said process is run at a temperature in the range of −10° C. to 200° C.

13. The process in accordance with claim 8, wherein said bicyclo amidine concentration is 0.05 to 1 g-mole/l.

14. The process in accordance with claim 8, wherein said acid gas removal solvent is a physical solvent selected from the group consisting of Selexol, PEG 400, Propylene carbonate, N-β-hydroxyethylmorpholine, N-methyl-2-pyrrolidone, methanol, sulfolane, tributyl phosphate and water.

* * * * *